Patented Dec. 10, 1935

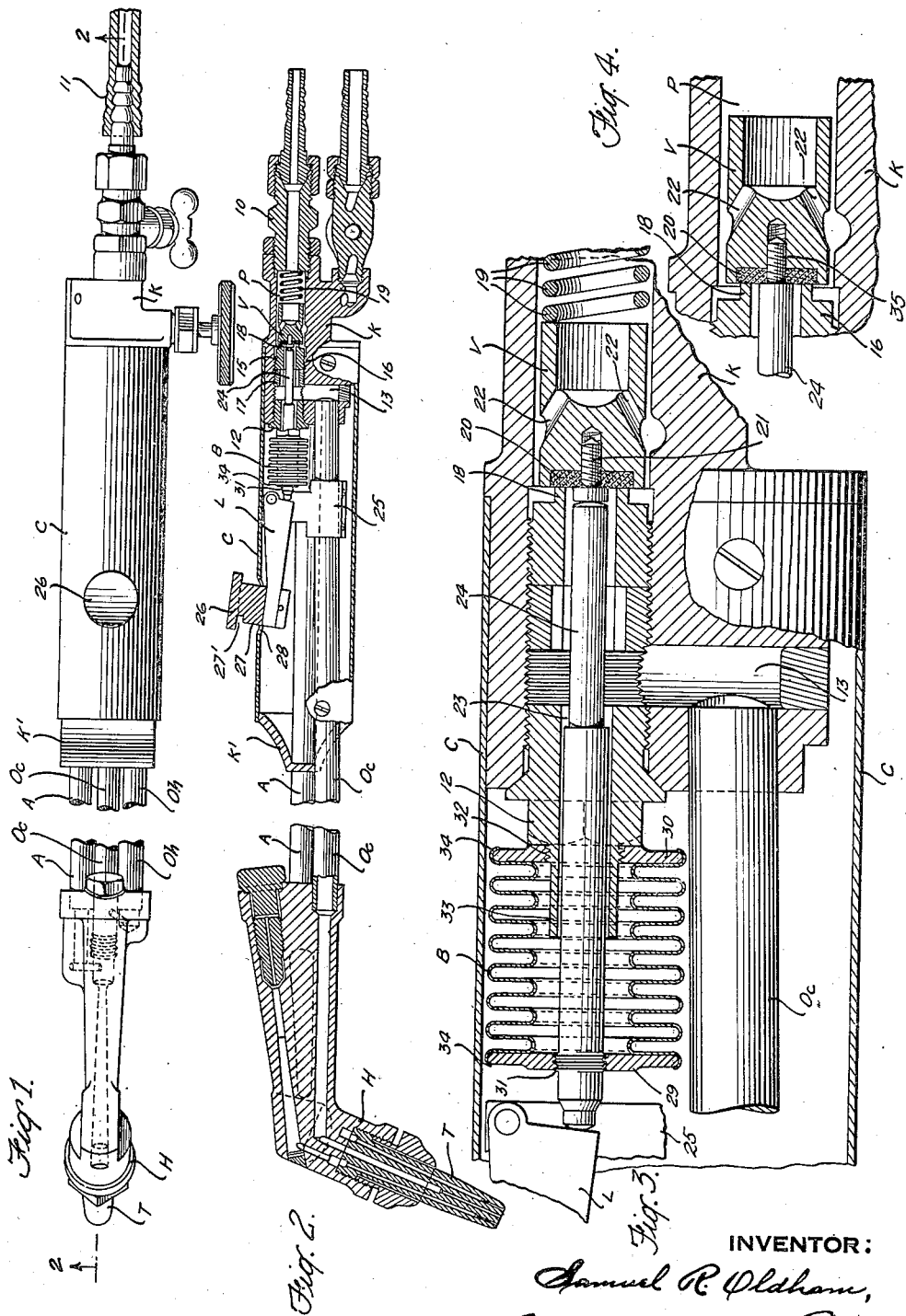

2,024,057

UNITED STATES PATENT OFFICE 2,024,057

BLOWPIPE

Samuel R. Oldham, Chicago, Ill., assignor to The Oxweld Railroad Service Company, a corporation of Delaware Application February 25, 1932, Serial No. 595,155

4 Claims. (Cl. 158—27.4)

This invention relates to welding apparatus as blowpipes and particularly to improved valve mechanism for controlling the flow of gas through passages thereof.

In metal cutting blowpipes especially, the slidable stem, which is actuated to unseat the cutting oxygen valve, extends through a bore that communicates with a passage or valve chamber from which oxygen at comparatively high pressure—between 20 and 140 pounds per square inch—is delivered to the cutting tip of the blowpipe. Heretofore, it has been the practice to avoid leakage through the bore and past the stem by means of a packing gland that bridges the joint between the outer end of the bore and the stem and is held in place by a compression nut. In many instances such valves leak soon after they are placed in service because, in assembling them at the factory or repair shop, the packing nut is usually tightened only sufficiently to prevent leaks during testing but not tight enough to compress the packing to cause binding of the stem, which must move freely. During use, many more valves become leaky because the packing dries out. To make the blowpipe compact and to protect these valves from damage, the latter and their packing means are ordinarily enclosed within the blowpipe handle, both ends of which are permanently closed. Consequently the packing and nut are inaccessible for adjustment or repair by the operator; so the blowpipe, when leaky, must be taken out of service and returned to the factory or to a special repair shop, which involves the loss of the use of the blowpipe and incurs considerable maintenance expense.

Accordingly, the principal object of this invention is to provide an improved leakproof blowpipe valve mechanism, wherein the use of packing may be dispensed with and access to the interior of the blowpipe handle for adjustment or repairs is rendered unnecessary; and wherein assembly of the valve with the blowpipe and its disconnection therefrom will be facilitated and the cost of maintenance minimized as compared with blowpipes heretofore known.

Generally speaking, an improved valve mechanism according to this invention comprises a resiliently yieldable tubular sealing sleeve hermetically connected both to the outer end of the valve stem and to a fitting having a bore or aperture through which the stem is slidable. This fitting is preferably removably secured to the wall of the valve chamber so as to be capable of assembly with or disconnection therefrom together with the stem and the sealing sleeve as a unit. In this arrangement, the resilient sleeve may also serve to restore the stem to its normal position. Moreover, the valve mechanism, with its improved sealing means, is housed inside the blowpipe handle or casing but operable from the exterior thereof.

The above and other objects and novel features of the invention will be apparent from the following description taken with the accompanying drawing, in which, Fig. 1 is a plan view of one type of blowpipe embodying the present invention.

Fig. 2 is a view in longitudinal section on line 2—2, Fig. 1.

Fig. 3 is a detailed fragmentary sectional view similar to Fig. 2 but on an enlarged scale, showing more clearly the details of this invention.

Fig. 4 is a fragmentary view in section similar to Fig. 3 and showing a slightly modified relation of the valve stem to the valve.

Referring to the drawing, the invention is shown as applied to an oxy-acetylene cutting blowpipe although it is to be clearly understood that the same may be applied to welding blowpipes and to all situations where shut-off valves are used in cutting or welding equipment. The apparatus as herein shown, may include a blowpipe head H having a burner tip T attached thereto and a tubular handle or casing C. Suitable gas conduits A, Oc, and Oh respectively extend through the casing C and connect the fuel and oxygen passages to passages in a plug or casting K secured in the rear end of the handle C; conduit A being for acetylene or other fuel gas, conduit Oh for oxygen to be mixed therewith, and conduit Oc for commercially pure oxygen to be employed in cutting. The oxygen passage P through plug K connects with the conduit Oc; the passages to the other conduits not being shown since they are unnecessary to the understanding of the present invention. The forward end of the casing is closed by a plug K'. The plugs K and K' are thus secured in the ends of the casing C and in the nature of the construction and the attachment of the various conduits to these plugs renders the latter difficult to remove and the interior of the handle practically inaccessible.

The passage P is closed at one end by a coupling 10 by means of which the passage is connected through a hose connection 11 to a suitable source of oxygen (not shown); the other end of the passage or chamber P being closed by a fitting such as a plug 12 threaded thereinto and constituting a part of the wall of the passage. A cross passage 13 connects the passage P and the conduit Oc, and the flow of oxygen through passage P is controlled by a valve V located within the passage P and confined between the end of the coupling 10 and an annular valve nozzle 15; the valve nozzle being held stationary in the passage by a threaded connection 16 with the wall of the passage and an annular locking screw 17 also threaded into the passage. The valve nozzle is provided at its rear end with an annular lip 18 spaced from the wall of the passage so as to afford a seat for the valve and the valve is normally held pressed against the seat by a spring 19 positioned between the valve and a shoulder at the end of the coupling 10. The end of the valve toward the lip 18 may be provided with a washer 20 of yieldable material, as rubber or rubber composition, held thereto by a screw 21 and positioned to rest against the lip when the valve is closed thereby providing a leak-tight seal; a suitable passage 22 being provided through and lengthwise of the valve member permitting the flow of oxygen past the same when the valve is open.

The plug 12 has an opening therethrough in the nature of a bore 23 through which a valve-actuating stem 24 is slidably extended so as to project into the passage P for controlling the opening and closing of the valve. One end of this stem is adapted to engage the valve V, and its other end extends through and beyond the plug 12 where it is engageable by a shoulder on an operating lever L, which is pivoted to a bracket 25. The lever L is provided with a button or thumb piece 26 located outside the casing C and connected with the lever by a lug 27 projecting through an aperture 28 in the casing C, the lug 27 having a notch 27' to receive the edge of the aperture 28 whereby the valve may be temporarily locked in open position.

The valve stem 24 should be freely slidable in its operation while, at the same time, the escape of fluid through the bore through which it slides should be dependably prevented, preferably by means which will not become readily worn or damaged; will not deteriorate from use or for other reasons, in its effectiveness as a seal; and will not require attention or servicing. To this end, I provide a seal in the form of a bellows-like sleeve B of resiliently yieldable material, preferably metal such as copper or brass, which is integrally connected at one end to the wall of the passage P and preferably to the plug 12 so as to surround the bore 23 and, at its other end to the stem 24 near its outer end. These connections may be made by means of comparatively thick plates 29 and 30 integral with the ends of the sleeve, which plates are soldered, welded or otherwise permanently secured to the plug and to the stem on lines encircling, respectively, the stem and the opening through the plug, so as to hermetically seal the said opening and dependably prevent leakage through the bore of the plug. For convenience in initial assembling the plates 29 and 30 with the stem 24 and plug 12, these members are provided with interengageable threads as shown at 31 and 32; the former between the stem and plate 29 and the latter between a sleeve 33 projecting from plug 12 and plate 30. After threading these members one upon the other in the above manner, they are preferably sweated or otherwise permanently attached together. The sleeve B may also be attached to the plates by sweating the ends thereof to the peripheries of the plates with said ends overlapping said peripheries, as shown at 34 in Fig. 3 of the drawing.

The resiliency of the sleeve and the corrugations of its walls render the same compressible under influence of the lever L and capable of restoring itself to its normal expansion when pressure on the lever is released, since when the bellows is permitted to expand, the stem will be drawn away from the valve permitting the latter to be closed by the spring 19 and the gas pressure behind it. It will appear from the above description that the stem 24 and the plug P are permanently connected together by the sleeve B, hence these three members together constitute a unitary element which may be assembled with the blowpipe and withdrawn as a unit. For purposes of compactness, protection, and convenience of operation, this unit and its associated mechanism, except the thumb piece 26, are preferably located within the casing C of the handle which, as stated above, is closed at its ends by the plugs K and K'. The mechanism for operating the valve V is thus practically inaccessible and it is, therefore, of great importance that the sealing qualities of the sleeve B should be durable and dependable as in the case of the construction hereinbefore described.

As an alternative of the above arrangement, the valve V may be secured to the stem 24 by a threaded connection as shown at 35 in Fig. 4 and in that case the spring 19 may be omitted, the resiliency of the sleeve serving to close the valve upon release of the lever L.

In operation, when it is desired to use the blowpipe for cutting, the heating flame is lighted and applied to the work to be cut until the same is raised to its ignition temperature whereupon the button 26 is depressed, opening valve V whereby oxygen is permitted to flow to the nozzle through conduit Oc. When it is desired to discontinue the cut, the button is released, whereupon the stem 24 is drawn to the left and the valve automatically closes against its seat. When the valve is open leakage around the stem is prevented by the sleeve B, the same also serving to retract the stem 24 to its inoperative position upon release of the lever L.

Various changes may be made in the details of the herein-disclosed construction without departing from the spirit of this invention; and while the improved arrangement of the bellows-like sealing sleeve in connection with the stem and the plug of a valve assembly is especially adapted for use in combination with and within the handles or casings of metal cutting or welding blowpipes, it is to be understood that some features of the improved construction may be utilized in various other devices where the requirements are similar to those described here.

I claim:

1. In a blowpipe, the combination of a permanently closed hollow handle; a casting located therein and having a passage therethrough; a valve controlling the flow of gas through the passage; a fitting secured to said casting and disposed inside the handle and having a bore communicating with the passage; a member extending through the bore and into said passage for operating the valve, said member projecting from said fitting into the handle; and a contractible and expansible sleeve having its opposite ends hermetically sealed to the fitting and the member, respectively, to prevent leakage through the bore.

2. In a blowpipe, the combination of a handle having a hollow member disposed therein and forming part of a passage through which fluid is delivered, means associated with said hollow member adapted to form a valve seat, a fitting detachably connected to said hollow member and having a bore communicating with the passage, a valve disposed within said hollow member and having a stem associated therewith extending through the bore and projecting within said handle, and a contractible and expansible sleeve encircling said stem and surrounding the end of the bore, said sleeve being hermetically joined to said stem and to said fitting around the bore.

3. In a blowpipe, the combination of a handle comprising a casing carrying a nozzle, a hollow member disposed within said casing and forming part of a passage through which fluid is adapted to be delivered to said nozzle, means forming a valve seat disposed in the passage, a valve arranged in the passage adapted to cooperate with said valve seat, a fitting in threaded engagement with said hollow member and having a bore communicating with the passage, an element axially movable in the bore of said fitting and extending into the passage and having the end thereof cooperating with said valve to operate the same, and means including bellows for forming a seal between the bore and said element, said bellows being disposed about the portion of said element projecting beyond the bore and outside of said fitting and having one end thereof secured to said element and the opposite end thereof secured to said fitting, said element, bellows and fitting forming a unitary structure disposed within said casing and detachable as a unit from said hollow member.

4. Blowpipe structure as defined in claim 3 in which said casing is provided with an aperture in the wall thereof, and means extending through the aperture and cooperating with said element for axially moving the same from the outside of said casing.

SAMUEL R. OLDHAM.